(12) United States Patent
Halbritter et al.

(10) Patent No.: US 12,030,262 B2
(45) Date of Patent: Jul. 9, 2024

(54) ROTATING MANIFOLDS AND ASSOCIATED SYSTEMS AND METHODS FOR VACUUM BAGGING LARGE COMPOSITE STRUCTURES

(71) Applicant: The Boeing Company, Chicago, IL (US)

(72) Inventors: Allen J. Halbritter, Summerville, SC (US); Luis F. Velasquez, Ladson, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/662,455

(22) Filed: May 9, 2022

(65) Prior Publication Data

US 2023/0356481 A1 Nov. 9, 2023

(51) Int. Cl.
*B29C 70/34* (2006.01)
*B29C 70/32* (2006.01)
*B29C 70/54* (2006.01)
*B29L 31/30* (2006.01)

(52) U.S. Cl.
CPC ............ *B29C 70/342* (2013.01); *B29C 70/32* (2013.01); *B29C 70/544* (2021.05); *B29L 2031/3082* (2013.01)

(58) Field of Classification Search
CPC ..... B29C 70/342; B29C 70/544; B29C 70/32; B29C 70/44; B29C 70/462; B29L 2031/3082
See application file for complete search history.

(56) References Cited

U.S. PATENT DOCUMENTS

| 3,865,525 A * | 2/1975 | Dunn | B25J 9/041 |
| | | | 901/17 |
| 8,652,388 B2 * | 2/2014 | Kulesha | B29C 70/326 |
| | | | 264/316 |
| 2014/0367039 A1 | 12/2014 | Robins et al. | |
| 2021/0107169 A1 | 4/2021 | Velasquez et al. | |

(Continued)

FOREIGN PATENT DOCUMENTS

EP 2 623 302 8/2013

OTHER PUBLICATIONS

Digivac, Industrial Throttle Plunger-Type Vacuum Valve, www.digivac.com/product-category/vacuum-valves/, accessed Jun. 9, 2023, https://web.archive.org/web/20230000000000*/https://www.digivac.com/product-category/vacuum-valves/ (Year: 2020).*

(Continued)

*Primary Examiner* — Alison L Hindenlang
*Assistant Examiner* — Erica Hartsell Funk
(74) *Attorney, Agent, or Firm* — Walters & Wasylyna LLC (57) ABSTRACT

A rotating manifold includes an axle, a hub rotatable relative to the axle about an axis of rotation, and a compressed air line in fluid communication housed in the axle. The rotating manifold further includes a vacuum line in fluid communication with the hub. The rotating manifold further includes a plurality of conduits connected to the hub. Each conduit of the plurality of conduits is in fluid communication with the vacuum line and houses a compressed air line arm in fluid communication with the compressed air line.

20 Claims, 12 Drawing Sheets

(56) References Cited

U.S. PATENT DOCUMENTS

2021/0268753 A1* 9/2021 Schibsbye ............ B29C 70/544
2021/0283868 A1   9/2021 Anderson et al.

OTHER PUBLICATIONS

Gemini Valve, Pneumatic Actuated Ball Valve, https://www.geminivalve.com/store/, accessed Jun. 8, 2023, https://web.archive.org/web/20230000000000*/https://www.geminivalve.com/store/ (Year: 2021).*

Kumar, AFP mandrel development for composite aircraft fuselage skin, Int'l J. of Aeronautical & Space Sci. 15(1), 32-43 (2014) (Year: 2014).*

European Patent Office, Extended European Search Report, App. No. 23153964.4 (Oct. 10, 2023).

DSTI: "Food & Beverage Solutions, Packaging & Processing," www.dsti.com (Oct. 22, 2020). URL: https://web.archive.org/web/20201022065414/https://www.dsti.com/pdfs/catalogs/DSTI-Packaging-Processing.pdf.

B-Command: "Compact Slip Ring Solustion," (Dec. 31, 2020). URL: https://www.rotarx.com/wp-content/uploads/B-COMMAND-rotarX-Product-Overview-EN.pdf.

* cited by examiner

FIG. 14 ns and associated systems and methods for vacuum bagging large composite structures

FIELD

The present disclosure is generally related to manufacturing composite structures and, more particularly, to rotating manifolds, methods, and associated systems for vacuum bagging large composite structures.

BACKGROUND

Composite structures are widely used as high-strength, low-weight materials to replace metals, such as in aerospace applications. Vacuum-bagging is commonly used during manufacturing of composite structures. Complications arise when vacuum-bagging large composite structures, such as large fuselage structures requiring rotation, particularly during rotation as vacuum tubes typically become entangled and reduce efficacy of the vacuum draw.

Accordingly, those skilled in the art continue with research and development efforts in the field of improving vacuum-bagging large composite structures.

SUMMARY

Disclosed are rotating manifolds.

In an example, the disclosed rotating manifold includes an axle, a hub rotatable relative to the axle about an axis of rotation, and a compressed air line housed in the axle. The rotating manifold further includes a vacuum in fluid communication with the hub. The rotating manifold further includes a plurality of conduits connected to the hub. Each conduit of the plurality of conduits is in fluid communication with the vacuum line and houses a compressed air line arm in fluid communication with the compressed air line.

Also disclosed are systems for vacuum bagging a composite layup.

In an example, the disclosed system includes a rotating manifold. The rotating manifold includes an axle, a hub rotatable relative to the axle about an axis of rotation, and a compressed air line housed in the axle. The rotating manifold further includes a vacuum in fluid communication with the hub. The rotating manifold further includes a plurality of conduits connected to the hub. Each conduit of the plurality of conduits is in fluid communication with the vacuum line and houses a compressed air line arm in fluid communication with the compressed air line. The system further includes a vacuum source in fluid communication with the rotating manifold by way of the vacuum line.

Also discloses are methods for drawing vacuum through the disclosed system.

In an example, the disclosed method for drawing vacuum through the disclosed system includes steps of (1) drawing air though the compressed air line into the hub; (2) directing the air through the plurality of conduits via the hub; and (3) actuating a vacuum assembly to enable vacuum draw through the vacuum bag (240).

Also disclosed are methods for vacuum bagging a composite layup over a tool, such as a drum-shaped mandrel.

In an example, the disclosed method includes steps of (1) positioning a vacuum bag into engagement with the composite layup; (2) coupling a rotating manifold with the vacuum bag; and (3) drawing vacuum from the vacuum bag by way of the rotating manifold.

Other examples of the disclosed rotating manifolds, systems, and methods will become apparent from the following detailed description, the accompanying drawings, and the appended claims.

DETAILED DESCRIPTION

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 1:
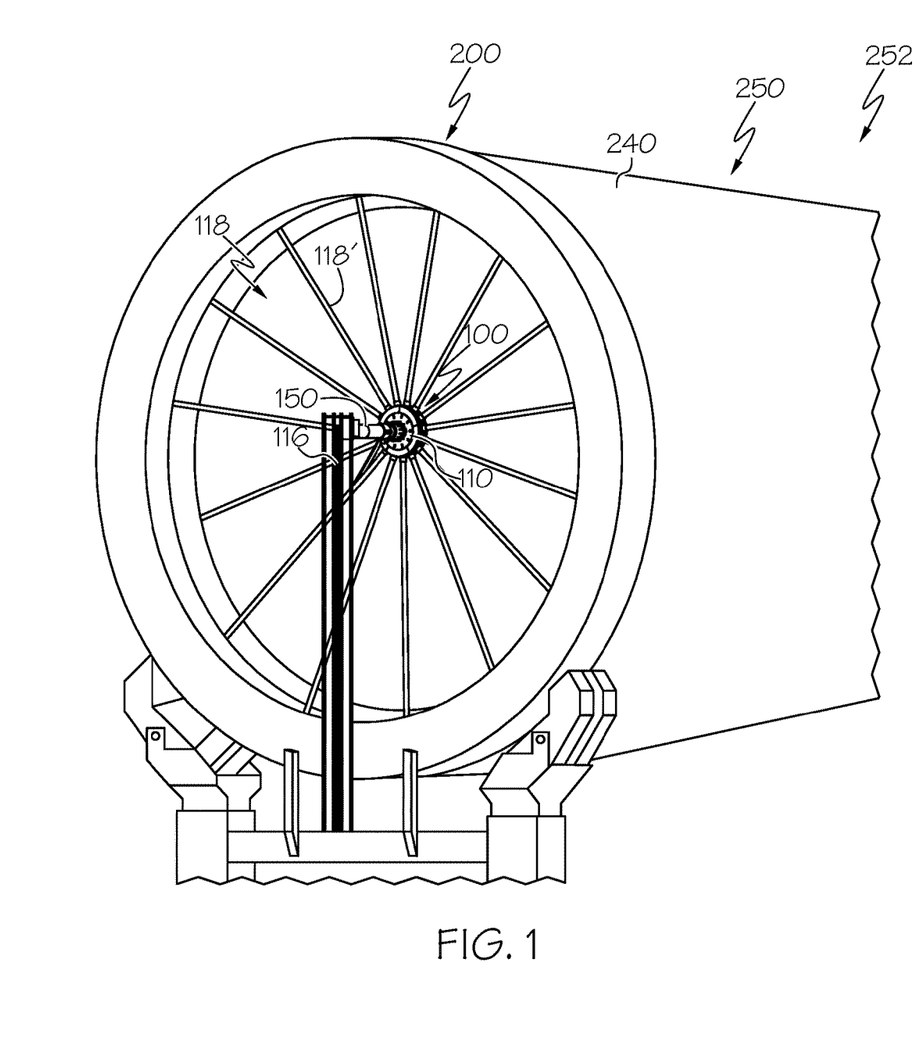
FIG. 1 is a perspective view of a rotating manifold coupled with a tool.

Referring to FIG. 1, disclosed is a rotating manifold 100. The rotating manifold 100 is designed for high volume vacuum bagging for compaction of composite materials. The rotating manifold 100 may include a modular high volume plenum system utilizing a rotational plenum design where high volume vacuum draw is distributed with compressed air to a plurality of pneumatically actuated vacuum valve assemblies via a plurality of conduits. In one example, the subcomponents of the modular high volume plenum system are held together via magnets for easy assembly and disassembly.

Figure 2:
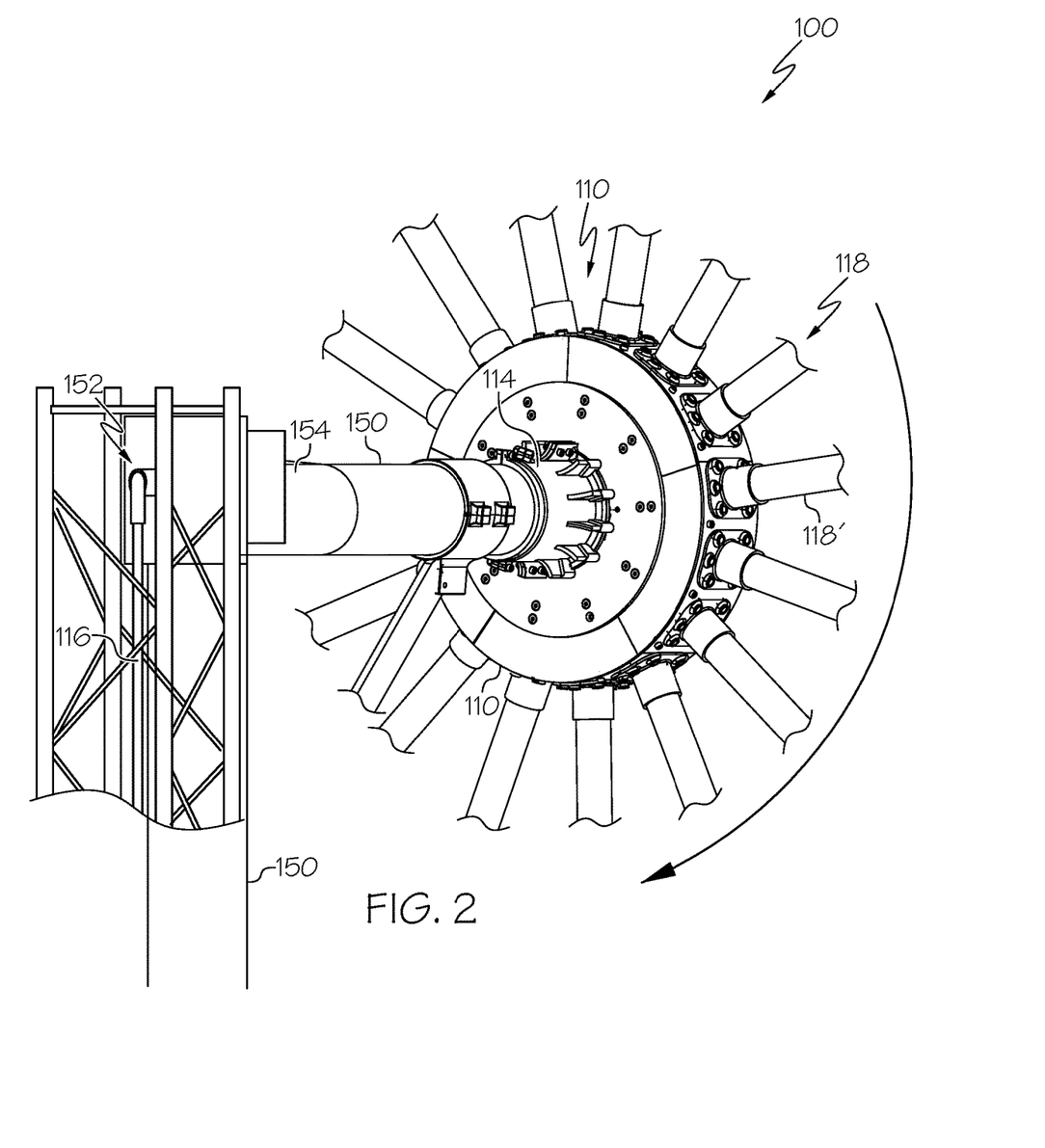
FIG. 2 is a perspective view of a portion of the rotating manifold of FIG. 1.

Still referring to FIG. 1, in one or more examples, the rotating manifold 100 includes a hub 110 and a compressed air line 116 housed in the axle 154, see FIG. 2. The hub 110 is rotatable relative to the compressed air line 116 about an axis of rotation A, see FIG. 4. In one example, the compressed air line 116 is housed in an axle 154 such that the hub 110 is rotatable relative to the axle 154 and a center axis A defined by the axle 154, see FIG. 4. The axle 154 may be of any desired diameter for use with the rotating manifold 100. In one example, the axle 154 is approximately 5" in diameter. Further, in one example, the hub 110 may be rotatable about the axle 154 via a bearing 114 located on an outside surface of the hub 110. The hub 110 may be rotatable about the axle 154 via both the bearing 114 and a second bearing 114b located on an outside surface of the hub 110, see FIG. 6.

The compressed air line 116 passes through the hub 110 and is in fluid communication with the compressed air manifold 160 which is housed inside the compressed air hub 112. The compressed air line 116, see FIG. 4, may extend beyond the axle 154 and may further extend perpendicular to the axle 154 via a rotational compressed air elbow fitting 152. The rotational compressed air elbow fitting 152 may be configured to maintain necessary supply of compressed air through the compressed air line 116.

Figure 4:
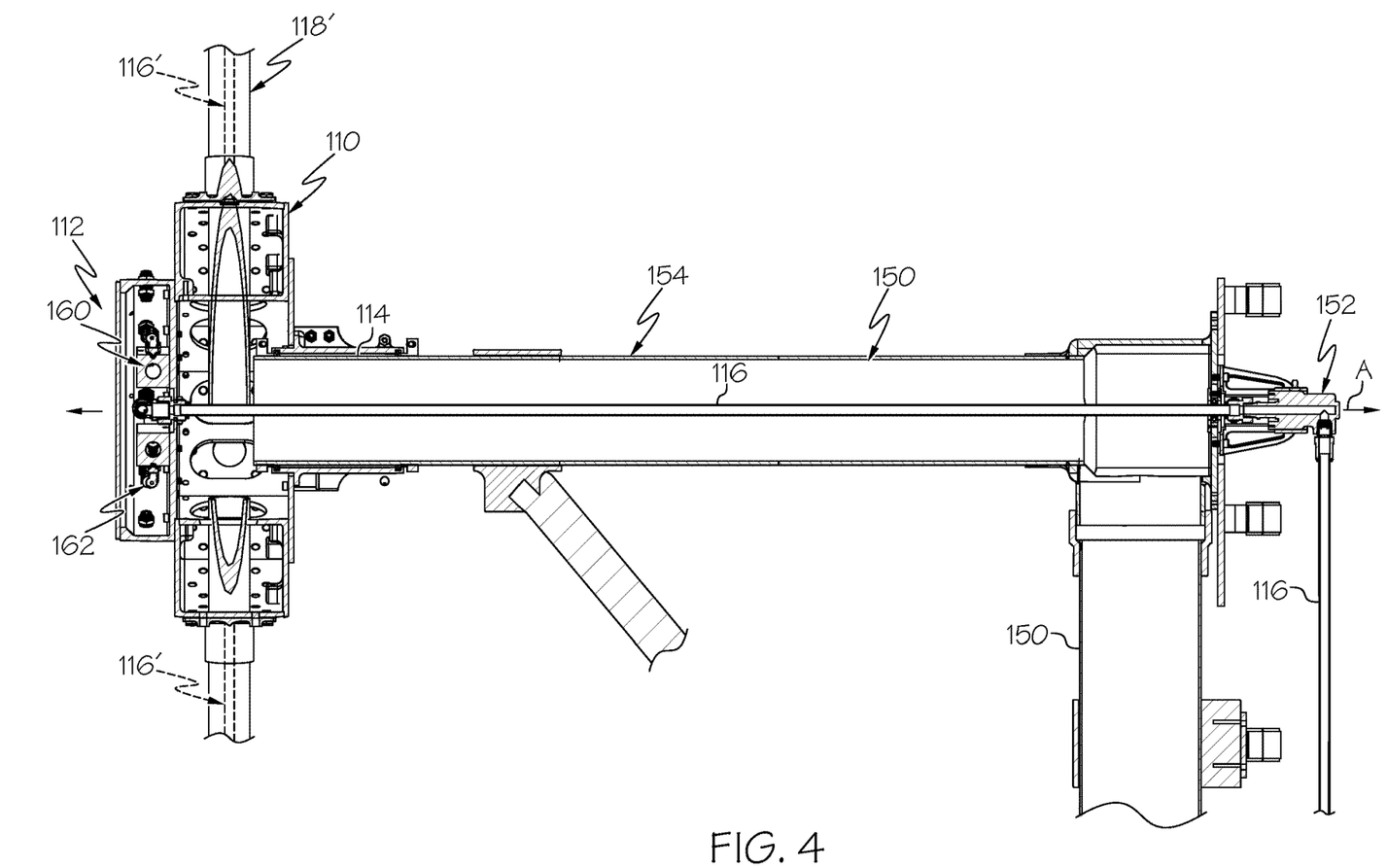
FIG. 4 is a cross-sectional view of a portion of the rotating manifold of FIG. 1.
Figure 9:
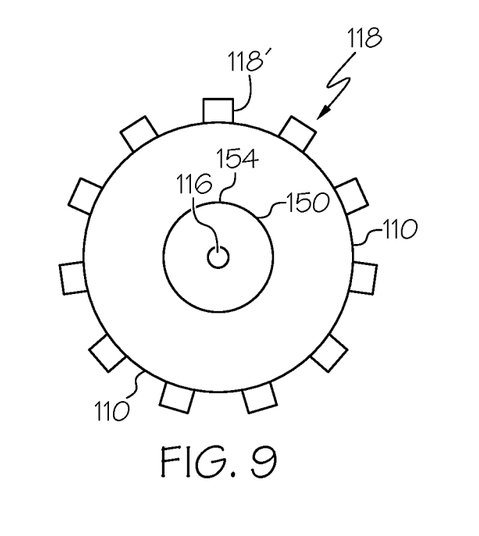
FIG. 9 is a cross-sectional schematic of a portion of the rotating manifold of FIG. 1.

Referring to FIG. 4, in one or more examples, the axle 154 further includes a vacuum line 150 in fluid communication with the hub 110. The vacuum line 150 is configured to selectively draw vacuum through the hub 110. In one example, the vacuum line 150 is housed within the axle 154, see FIG. 9, such that it surrounds the compressed air line 116. The vacuum line 150 may pivot to extend perpendicular to the axle 154 to couple with a vacuum source 210. The compressed air line 116 and vacuum line 150 are both housed inside the axle 154 and may both have a center axis A.

Figure 3:
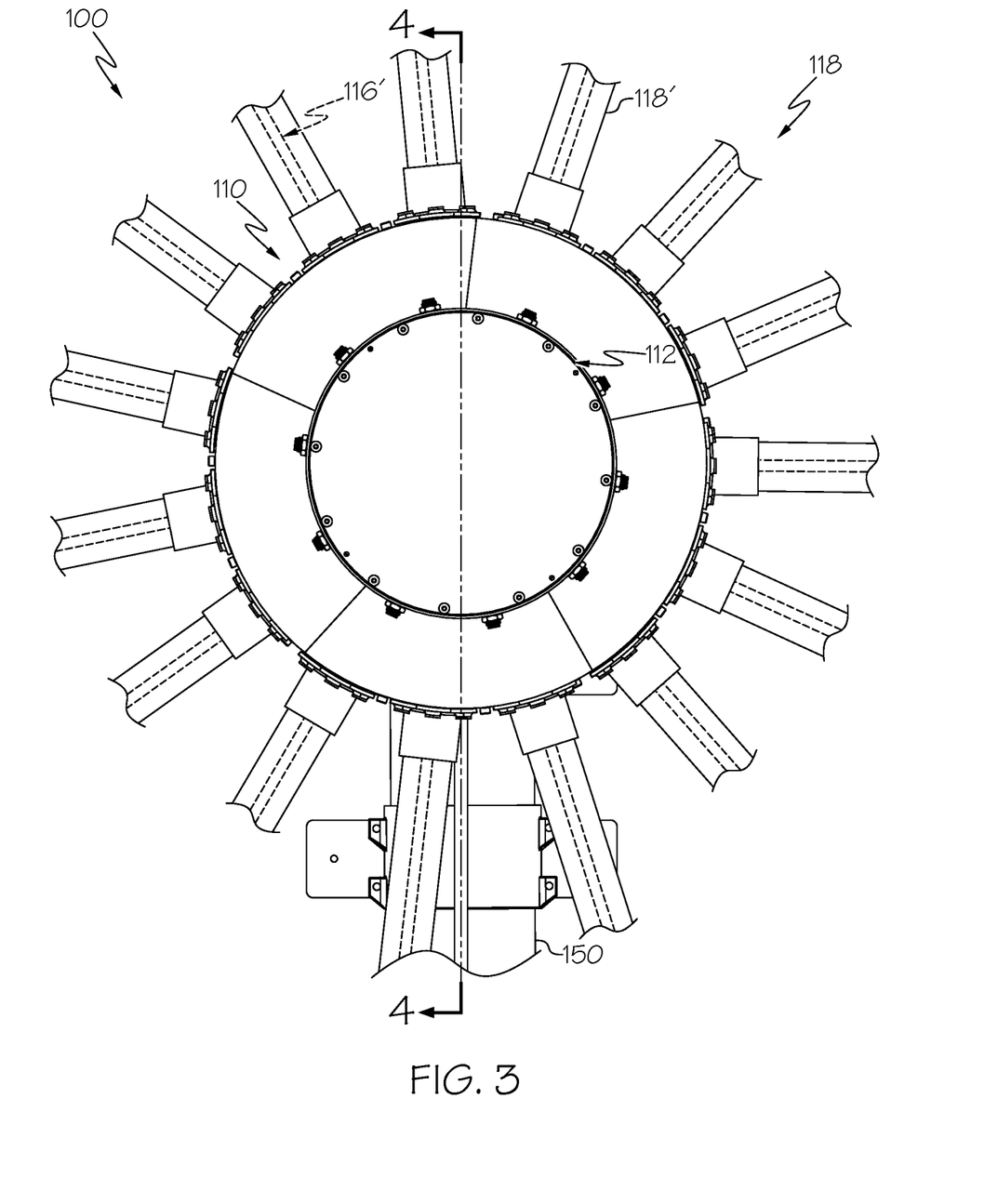
FIG. 3 is a perspective view of a portion of the rotating manifold of FIG. 1.
Figure 5:
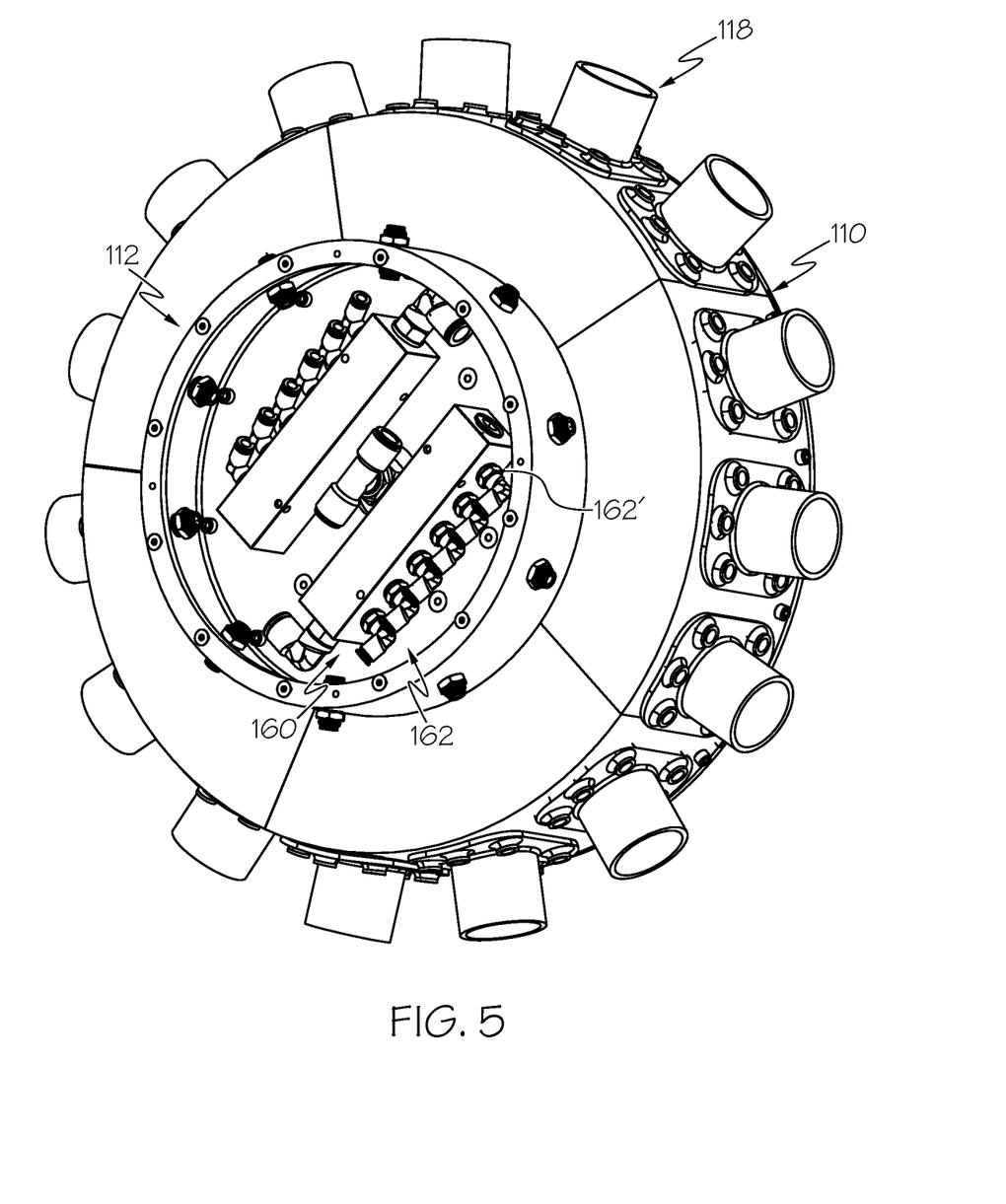
FIG. 5 is a perspective view of a portion of the rotating manifold of FIG. 1.

Referring to FIG. 3, FIG. 4, and FIG. 5, in one or more examples, the hub 110 may further be coupled with a compressed air hub 112. The compressed air hub 112 houses a compressed air manifold 160. The compressed air manifold 160 includes a plurality of ports 162 in fluid communication with the compressed air line 116. Each port 162' of the plurality of ports 162 may be individually controllable such that each may distribute compressed air based upon automated or manual control.

Figure 6:
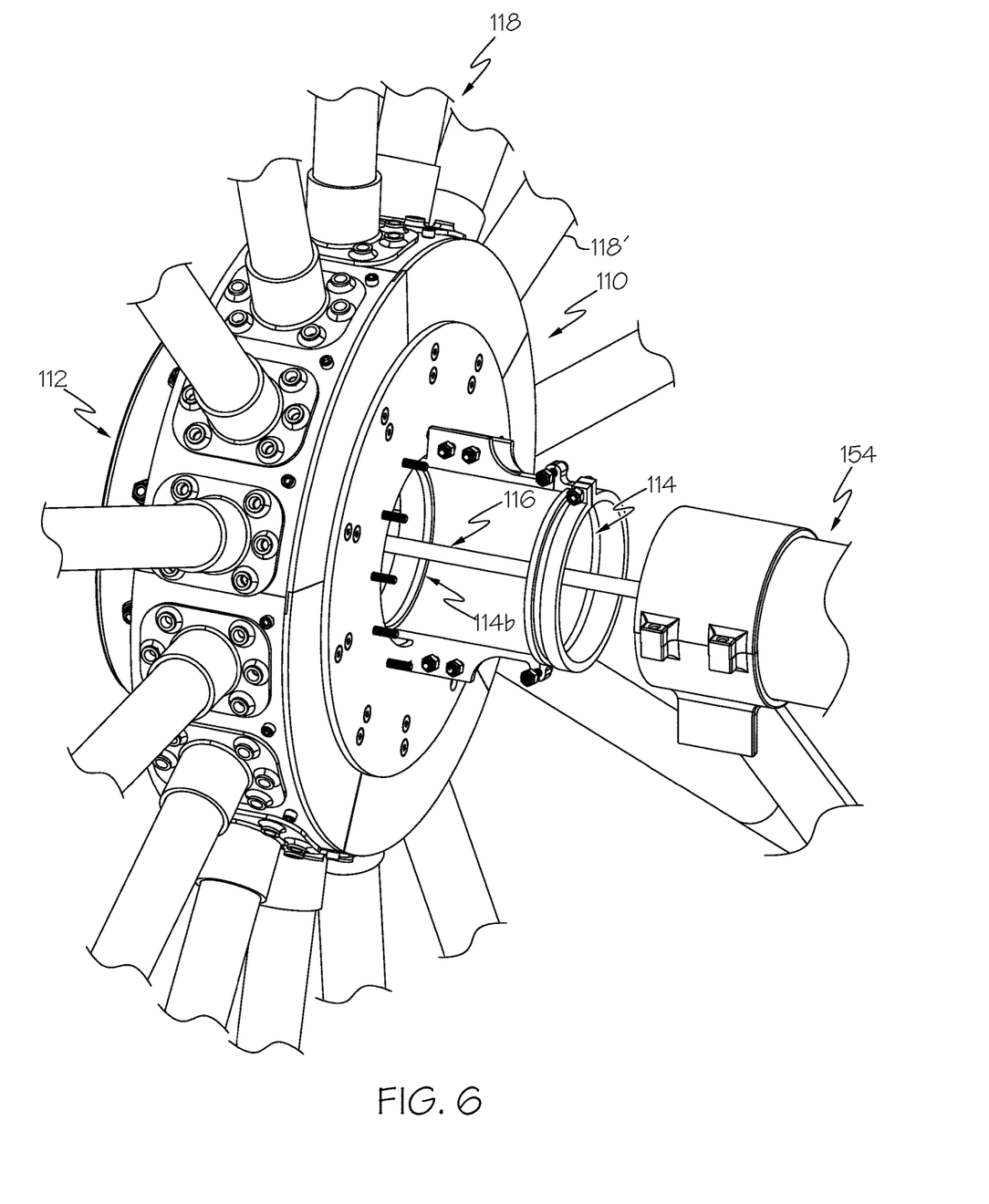
FIG. 6 is an exploded perspective view of a portion of the rotating manifold of FIG. 1.

Referring to FIG. 6, the rotating manifold 100 further includes a plurality of conduits 118 connected to the hub 110. Each conduit 118' of the plurality of conduits 118 is in fluid communication with the vacuum line 150 such that each is configured to draw vacuum. Further, each conduit 118' of the plurality of conduits 118 includes a compressed air line arm 116' that is in fluid communication with the compressed air line 116 via the compressed air manifold 160, see FIG. 4. In one example, each conduit 118' of the plurality of conduits 118 radially extends from the hub 110. Each conduit 118' of the plurality of conduits 118 may comprise an elastic material, such as a rubber material. In one example, each conduit 118' of the plurality of conduits 118 may be at least one of a tube, a hose, and a pipe. In one or more examples, the plurality of conduits 118 are substantially equidistantly distributed about the hub 110. Further, in another example, each conduit 118' of the plurality of conduits 118 is magnetically connected to the hub 110.

Figure 7:
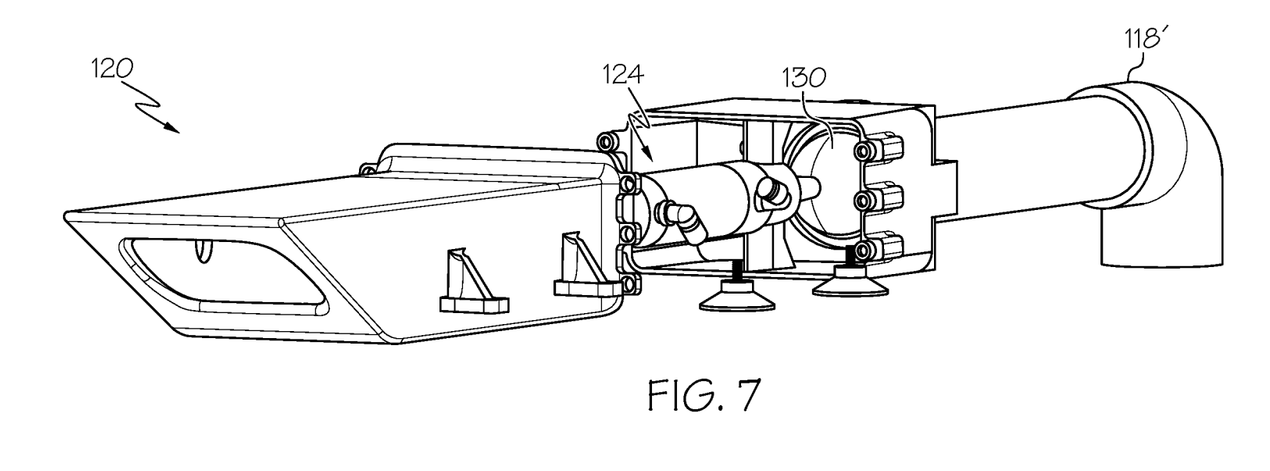
FIG. 7 is a perspective view of a portion of the rotating manifold of FIG. 1.
Figure 8:
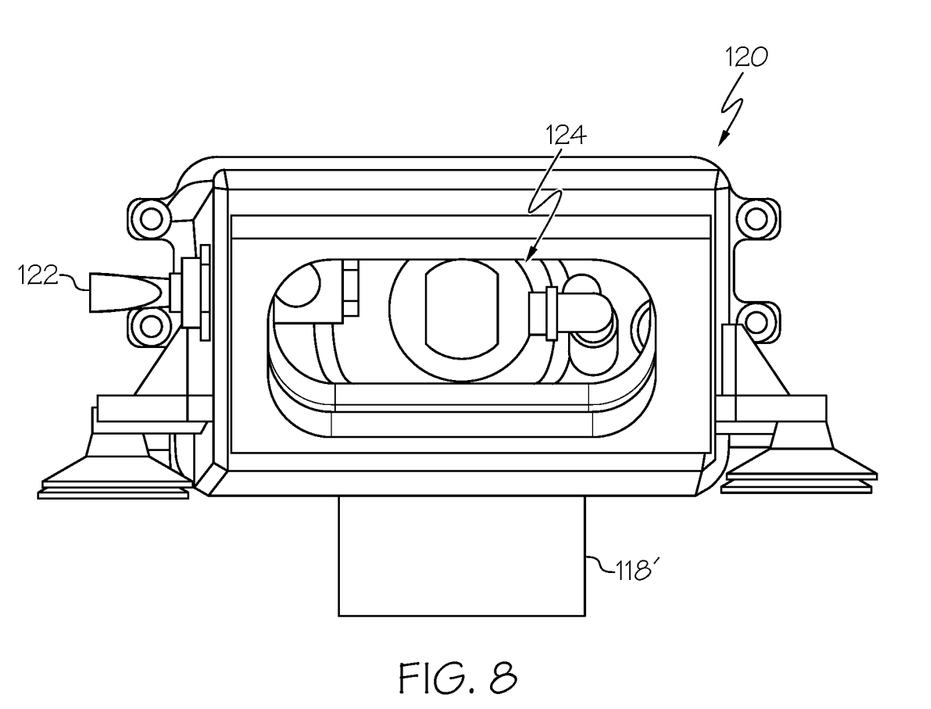
FIG. 8 is front perspective view of a portion of the rotating manifold of FIG. 1.

Referring to FIG. 7 and FIG. 8, in one or more examples, each conduit 118' of the plurality of conduits 118 includes a vacuum valve assembly 120. FIG. 7 and FIG. 8 illustrate perspective views of the vacuum valve assembly 120 portion of the rotating manifold. The vacuum valve assembly 120 may include a movable sealing member, such as a plunger 130. The plunger 130 is configured to move between at least two positions to block or allow vacuum draw based upon an actuator 124. The vacuum valve assembly 120 may further include a valve 122 configured to control vacuum flow through the vacuum valve assembly 120. In one example, the valve 122 is pneumatically actuatable between at least a first position and a second position. In another example, the valve 122 is a pneumatic compressed air valve that controls an actuator 124 to actuate the plunger 130. Upon pressure from the compressed air line 116, the valve 122 supplies air pressure to actuate the actuator 124 for releasing the plunger 130 to an open position to allow vacuum draw from the vacuum line 150.

Figure 10:
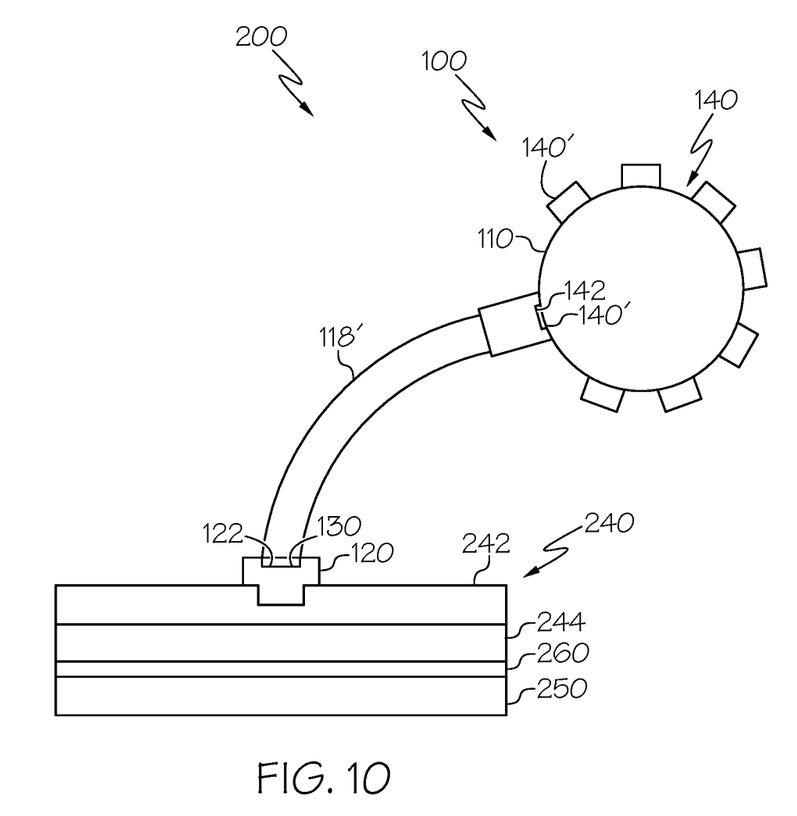
FIG. 10 is a cross-sectional schematic of a system for vacuum bagging a composite layup.

Referring to FIG. 10, in one or more examples, the hub 110 includes a plurality of vacuum ports 140 configured to engage the plurality of conduits 118. In one example, each vacuum port 140' of the plurality of vacuum ports 140 includes a valve 142 configured to selectively control vacuum flow through each conduit 118' of the plurality of conduits 118. The valve 142 may be automated or manually controlled.

Referring to FIG. 10, also disclosed is a system 200 for vacuum bagging a composite layup 260. The system 200 is designed for effective compaction of large composite structures, and particularly for fuselage structures for aircrafts. The composite layup 260 includes at least one ply of composite material (e.g., a composite ply) placed on (e.g., over) a tool 250. The composite layup 260 can include any number (e.g., one or more) of composite plies. The composite material includes a reinforcement material embedded in a polymeric matrix material. In one or more examples, the composite material is pre-impregnated ("pre-preg") thermoset composite material.

Still referring to FIG. 10, the system 200 includes a rotating manifold 100. the rotating manifold 100 includes a hub 110 and a compressed air line 116 housed in the hub 110. The hub 110 is rotatable relative to the compressed air line 116 about an axis of rotation A. In one example, the compressed air line 116 is housed in an axle 154 such that the hub 110 is rotatable relative to the axle 154 and a center axis A defined by the axle 154, see FIG. 4. In one example, the hub 110 is rotatable about the axle 154 via a bearing 114 located on an outside surface of the hub 110. The hub 110 may be rotatable about the axle 154 via both the bearing 114 and a second bearing 114b located on an outside surface of the hub 110, see FIG. 6.

Referring to FIG. 4, in one or more examples, the axle 154 further includes a vacuum line 150 in fluid communication with the hub 110 via the axle 154. The vacuum line 150 is configured to selectively draw vacuum through the hub 110 by way of the vacuum source 210. In one example, the vacuum line 150 is housed within the axle 154, see FIG. 9, such that it surrounds the compressed air line 116.

The rotating manifold 100 of the system 200 further includes a plurality of conduits 118 connected to the hub 110. Each conduit 118′ of the plurality of conduits 118 is in fluid communication with the compressed air line 116. In one example, each conduit 118′ of the plurality of conduits 118 is connected to the hub 110 with a magnet. In another example, each conduit 118′ of the plurality of conduits 118 comprises a vacuum valve assembly 120.

The system 200 further includes a vacuum source 210 in fluid communication with the rotating manifold 100 by way of the hub 110 via vacuum line 150 within the axle 154. The vacuum source 210 may draw any amount of vacuum suitable for the intended application, such as a high flow vacuum draw. In one example, the vacuum source 210 draws at least 100 cubic feet per minute.

Referring to FIG. 10, the system 200 includes a vacuum bag 240. In one example, the vacuum bag 240 is positioned on an outside surface of the composite layup 260. The vacuum bag 240 includes an impermeable layer 242. The impermeable layer 242 is substantially impermeable to fluids, including air. In one example, the impermeable layer 242 comprises a polymeric material. In another example, the impermeable layer 242 comprises rubber. In one specific, non-limiting example, the impermeable layer 242 comprises a Mosites™ rubber sheet. The vacuum bag 240 further includes a flow media layer 244. In on example, the flow media layer 244 comprises a biplanar mesh. In another example, the flow media layer 244 is a sheet of material, such as a biplanar mesh.

Referring to FIG. 1 and FIG. 10, in one or more example, the system 200 further includes a tool 250. The tool 250 may be any size or configuration based upon the desired structure. In one example, the tool 250 may be a mandrel. In one specific example, the tool 250 is a drum-shaped mandrel 252.

Figure 11:
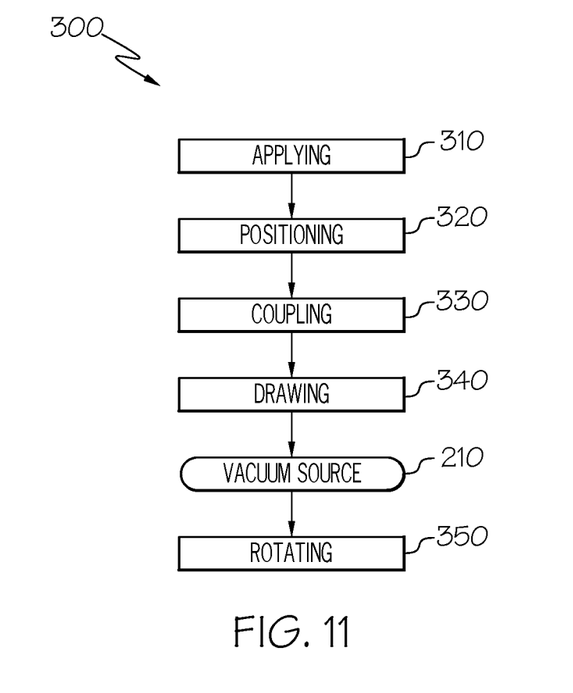
FIG. 11 is a flow diagram of a method for vacuum bagging a composite layup.

Referring to FIG. 11, disclosed is a method 300 of vacuum bagging a composite layup 260 over a drum-shaped mandrel 252. The method 300 includes positioning 320 a vacuum bag 240 into engagement with the composite layup 260. The vacuum bag 240 includes an impermeable layer 242. The impermeable layer 242 is substantially impermeable to fluids, including air. In one example, the impermeable layer 242 comprises a polymeric material. In another example, the impermeable layer 242 comprises rubber. In one specific, non-limiting example, the impermeable layer 242 comprises a Mosites™ rubber sheet. The vacuum bag 240 further includes a flow media layer 244. In on example, the flow media layer 244 comprises a biplanar mesh. In another example, the flow media layer 244 is a sheet of material, such as a biplanar mesh.

Still referring to FIG. 11, the method 300 includes coupling 330 a rotating manifold 100 with the vacuum bag 240. The rotating manifold 100 includes a hub 110 and a compressed air line 116 housed in the hub 110. The rotating manifold 100 of the method 300 further includes a plurality of conduits 118 in fluid communication with the compressed air line 116 by way of the hub 110, wherein the hub 110 is rotatable relative to the compressed air line 116. In one example, the coupling 330 comprises positioning the plurality of conduits 118 into engagement with the vacuum bag 240.

The method 300 further includes drawing 340 vacuum from the vacuum bag 240 via the vacuum source 210 by way of the rotating manifold 100. Referring to FIG. 11, the method 300 further includes applying 310 the composite layup 260 to an outside surface of the drum-shaped mandrel 252 prior to the positioning 320. In one or more examples, the method 300 further includes rotating 350 the drum-shaped mandrel 252 simultaneously with the drawing 340.

Figure 12:
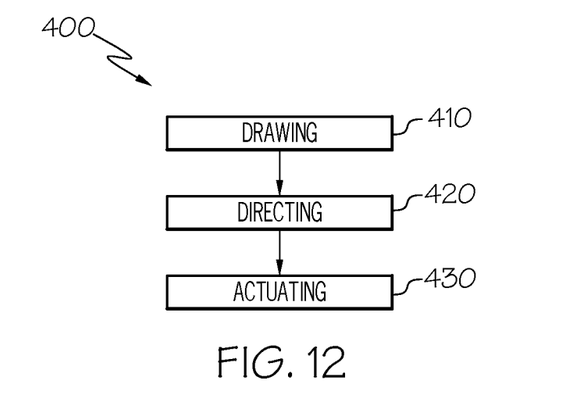
FIG. 12 is a flow diagram of a method for drawing a vacuum through the system of FIG. 10.

Referring to FIG. 12, in one or more examples, disclosed is a method 400 for drawing vacuum through the system 200. In one example, the method 400 includes drawing 410 air though the compressed air line 116 into the hub 110. The method 400 further includes directing 420 the air through the plurality of conduits 118 via the hub 110. The method 400 further includes actuating 430 the vacuum valve assembly 120 to enable vacuum draw through the vacuum bag 240. Upon actuating 430, vacuum may be drawn via each vacuum valve assembly 120 in fluid communication with the vacuum line 150 by way of the vacuum source 210.

Figure 13:
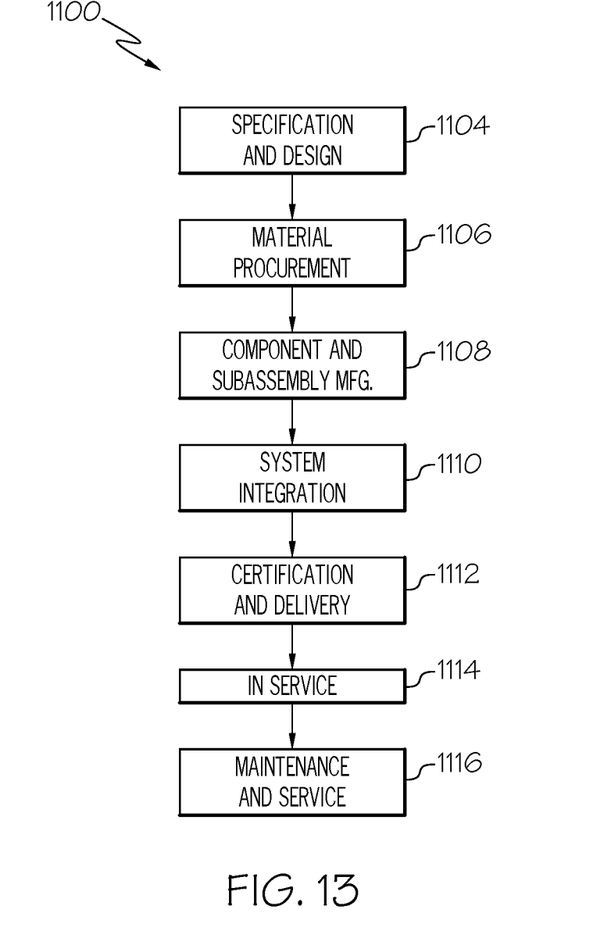
FIG. 13 is a flow diagram of an aircraft manufacturing and service methodology.
Figure 14:
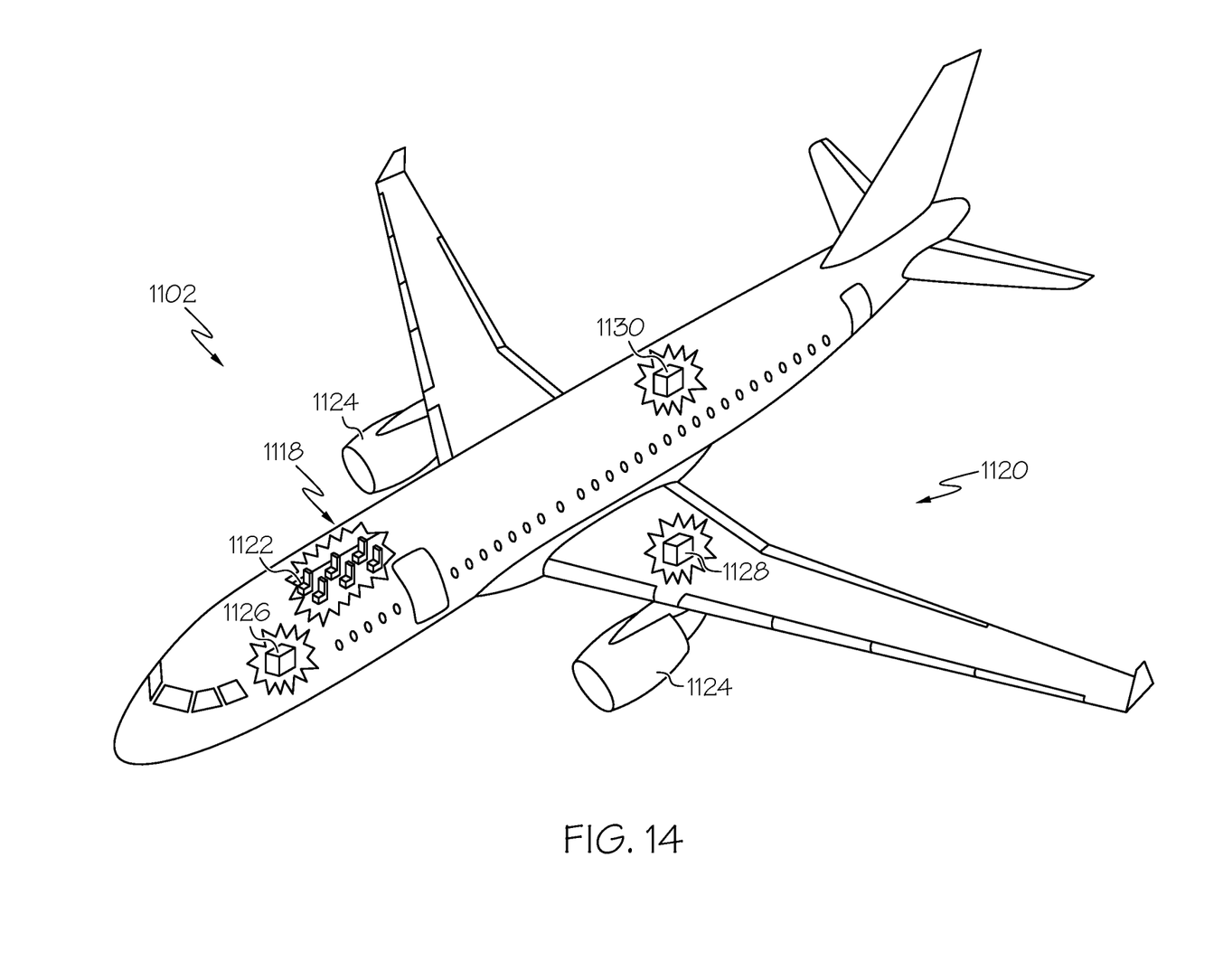
FIG. 14 is a schematic block diagram of an example of an aircraft.

Examples of the present disclosure may be described in the context of aircraft manufacturing and service method 1100 as shown in FIG. 13 and aircraft 1102 as shown in FIG. 14. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Rotating manifold(s), system(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the rotating manifold(s), system(s) and method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the rotating manifold(s), system(s) and method(s) disclosed herein include a variety of components, features, and functionalities. It should be understood that the various examples of the rotating manifold(s), system(s) and method(s) disclosed herein may include any of the components, features, and functionalities of any of the other examples of the rotating manifold(s), system(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A rotating manifold comprising:
an axle;
a hub rotatable relative to the axle about an axis of rotation;
a compressed air line;
a vacuum line in fluid communication with the hub, wherein the axle houses at least a portion of the vacuum line and at least a portion of the compressed air line, wherein the portion of the vacuum line within the axle surrounds the portion of the compressed air line within the axle; and
a plurality of conduits connected to the hub, wherein each conduit of the plurality of conduits is in fluid communication with the vacuum line and wherein each conduit of the plurality of conduits houses a compressed air line arm in fluid communication with the compressed air line.

2. The rotating manifold of claim 1, wherein the plurality of conduits are substantially equidistantly distributed about the hub.

3. The rotating manifold of claim 1, wherein each conduit of the plurality of conduits radially extends from the hub.

4. The rotating manifold of claim 1, wherein each conduit of the plurality of conduits comprises at least one of a tube, a hose, and a pipe.

5. The rotating manifold of claim 1, wherein each conduit of the plurality of conduits is magnetically connected to the hub.

6. The rotating manifold of claim 1, wherein each conduit of the plurality of conduits comprises a vacuum valve assembly.

7. The rotating manifold of claim 6, wherein the vacuum valve assembly comprises a plunger.

8. The rotating manifold of claim 6, wherein the vacuum valve assembly comprises a valve configured to control vacuum flow through the vacuum valve assembly.

9. The rotating manifold of claim 8, wherein the valve is pneumatically actuatable between at least a first position and a second position.

10. The rotating manifold of claim 8, wherein the vacuum valve assembly comprises an actuator.

11. The rotating manifold of claim 1, further comprising a bearing located between the hub and the axle.

12. The rotating manifold of claim 1, wherein the hub comprises a plurality of vacuum ports configured to engage the plurality of conduits.

13. The rotating manifold of claim 12, wherein each vacuum port of the plurality of vacuum ports comprises a valve configured to selectively control vacuum flow through each conduit of the plurality of conduits.

14. A system for vacuum bagging a composite layup, the system comprising:
a rotating manifold, the rotating manifold comprising:
an axle;
a hub rotatable relative to the axle about an axis of rotation;
a compressed air line;
a vacuum line in fluid communication with the hub, wherein the axle houses at least a portion of the vacuum line and at least a portion of the compressed air line, wherein the portion of the vacuum line within the axle surrounds the portion of the compressed air line within the axle; and
a plurality of conduits connected to the hub, wherein each conduit of the plurality of conduits is in fluid communication with the vacuum line, wherein each conduit of the plurality of conduits houses a compressed air line arm in fluid communication with the compressed air line; and
a vacuum source in fluid communication with the rotating manifold by way of the vacuum line.

15. The system of claim 14, wherein each conduit of the plurality of conduits is connected to the hub with a magnet.

16. The system of claim 14, wherein each conduit of the plurality of conduits comprises a vacuum valve assembly.

17. The system of claim 14, wherein the vacuum source draws at least 100 cubic feet per minute.

18. The system of claim 14, further comprising a vacuum bag on an outside surface of the composite layup.

19. The system of claim 14, further comprising a tool.

20. A method of vacuum bagging a composite layup over a drum-shaped mandrel, the method comprising:
positioning a vacuum bag into engagement with the composite layup;
coupling a rotating manifold with the vacuum bag;
housing at least a portion of a compressed air line within an axle about which the rotating manifold is rotatable;
drawing air through the compressed air line into a hub of the rotating manifold;
connecting a plurality of conduits to the hub;
directing the air through the plurality of conduits via the hub;
housing at least a portion of a vacuum line within the axle such that the portion of the vacuum line within the axle surrounds the portion of the compressed air line within the axle;
actuating a vacuum valve assembly to enable vacuum draw through the vacuum bag; and
drawing vacuum from the vacuum bag by way of the rotating manifold and the vacuum line.

* * * * *